UNITED STATES PATENT OFFICE.

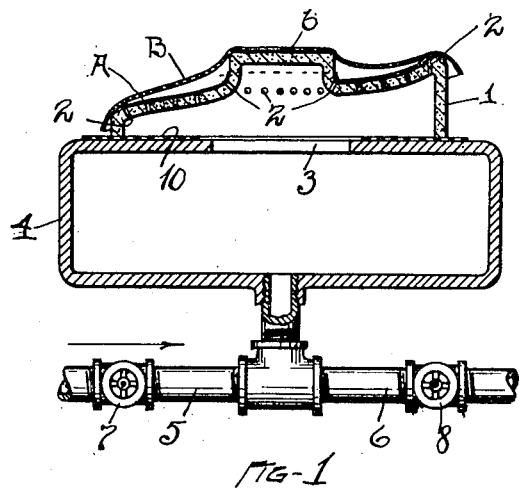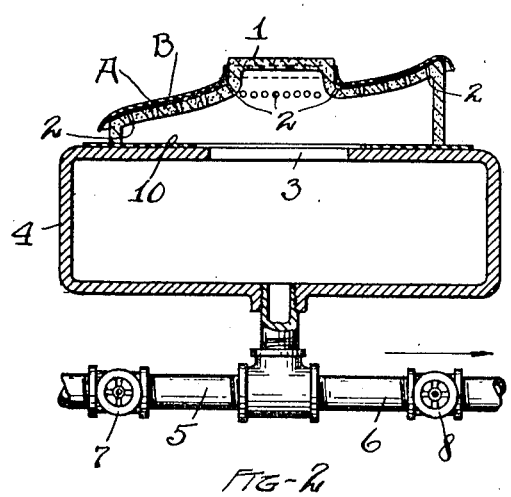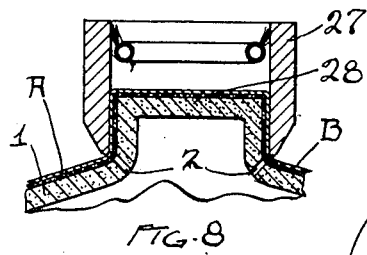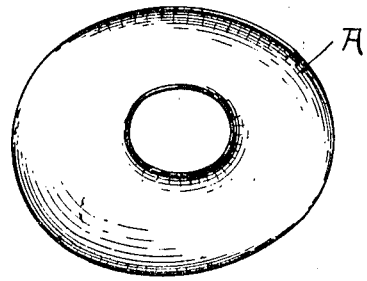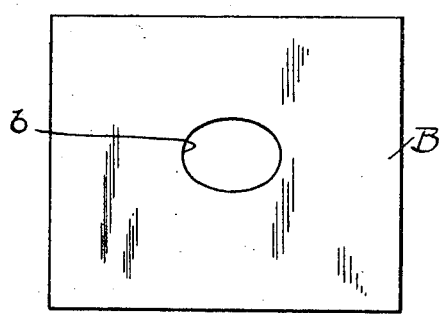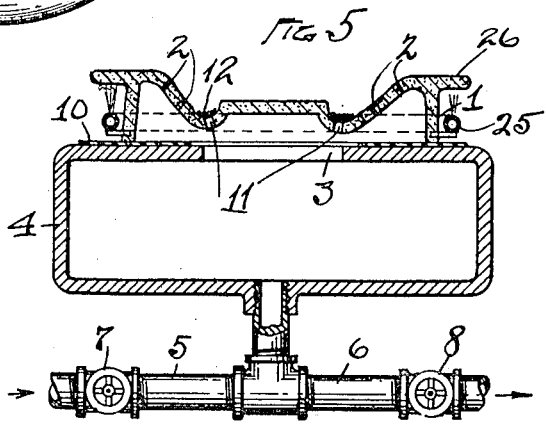

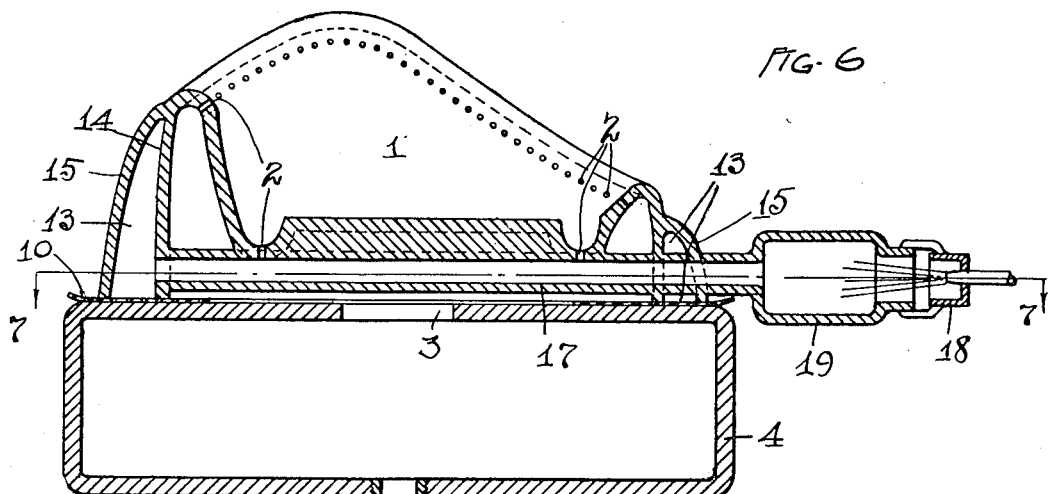
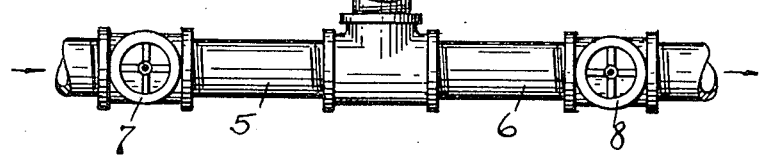
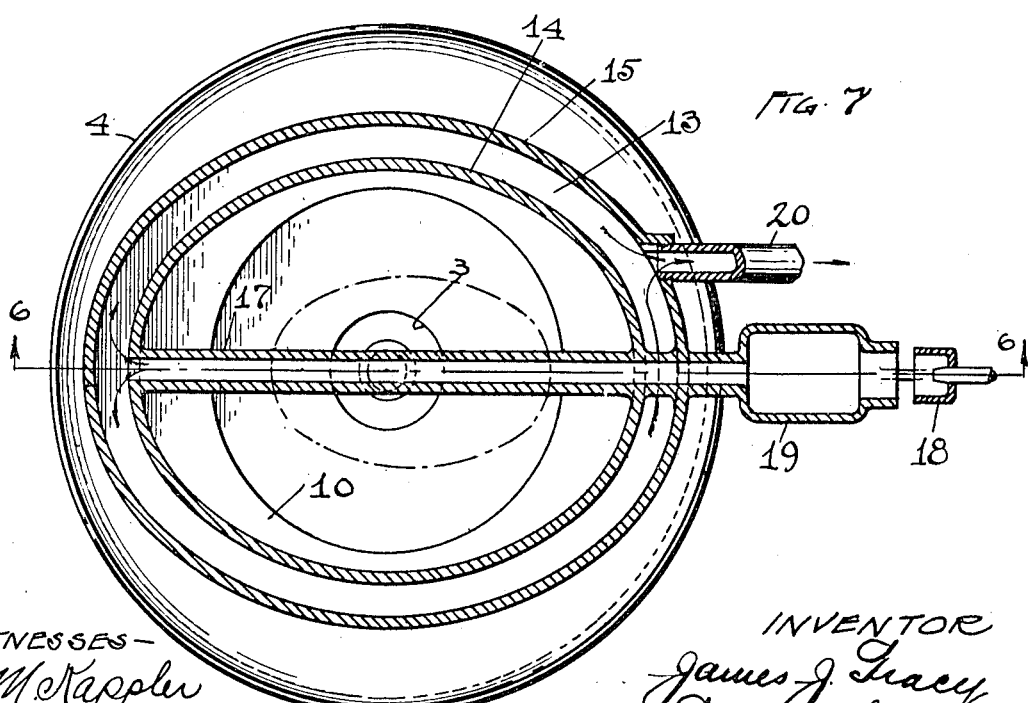

JAMES J. TRACY, OF CLEVELAND, OHIO.

MANUFACTURE OF HATS.

1,280,902. Specification of Letters Patent. Patented Oct. 8, 1918.

Application filed May 7, 1914. Serial No. 836,954.

*To all whom it may concern:*

Be it known that I, JAMES J. TRACY, a citizen of the United States, and a resident of Cleveland, county of Cuyahoga, and State of Ohio, have invented a new and useful Improvement in the Manufacture of Hats, of which the following is a specification, the principle of the invention being herein explained and the best mode in which I have contemplated applying that principle, so as to distinguish it from other inventions.

The present improved process relating, as indicated, to the manufacture of hats, has more particular regard to the manufacture of so-called velvet and plush hats. In contradistinction, both to straw hats and felt hats, hats of the type named are of composite construction, being regularly made up with an intermediate layer of buckram and a layer of velvet, silk, plush, or other covering material, as the case may be, applied to each side of such buckram layer. Particularly where velvet or plush is thus used to form the outer or cover layers of the hat, it is very difficult to assemble such layers without marring the material, the aim of the manufacturer, to achieve a "top without a mar," being hard to realize.

The only entirely satisfactory method heretofore used in the manufacture of hats of this kind has been an essentially hand method, the cover layer being cut out on a pattern, and then pasted by hand on the buckram layer, after the latter has been stretched over, and while it is still supported on, a mold. It has indeed been attempted to make hats of this kind by machine process, two heated dies being employed, the unshaped buckram layer being placed, together with the upper cover layer, in place on the lower or convex die, and the upper concave die being then brought down on top of such cover layer, thereby simultaneously shaping the buckram and securing the layer of velvet or the like thereto. This process, however, is objectionable in that the pressure of the upper die, combined with the heat and moisture, flattens out the pile of the velvet, and it is very difficult to restore the latter to give the soft natural appearance desired. It is also apt to leave pressure marks in the form of glossy places on other covering materials, even when they have no pile.

The object of the present process is to provide means whereby hats of the type in question may be manufactured rapidly and economically and without any of the objectionable results heretofore attaching to machine manufacture. To the accomplishment of the foregoing and related objects, the invention, then, consists of the steps hereinafter fully described and particularly pointed out in the claims.

The annexed drawings and the following description set forth in detail certain modes of carrying out the invention, such disclosed modes, however, illustrating but several of the various ways in which the principle of the invention may be used.

In said annexed drawings:—

Figure 1 is a central vertical section of an apparatus adapted for use in the present improved method of manufacture, the parts of a hat being shown in preliminary assembled condition on such apparatus; Fig. 2 is a similar sectional view showing the parts in question in a more advanced operative stage; Fig. 3 is a plan view of a shaped buckram layer forming one of the parts designed to be assembled by means of the foregoing apparatus; Fig. 4 is a similar plan view of a sheet of velvet which forms another of such parts; Fig. 5 is a sectional view corresponding with Figs. 1 and 2, but showing a modification in construction; Fig. 6 is a sectional view of another modified form of construction of the apparatus; Fig. 7 is a horizontal section of such last modified form, as indicated by line 7—7, Fig. 6; and Fig. 8 is a vertical section showing yet another modification.

Briefly stated, the steps involved in carrying on the present improved process are as follows. The buckram layer A may or may not be first shaped by itself, although the more expeditious method, where possible, will be to shape such layer together with the cover layer as practically one operation. Where the buckram is preliminarily shaped by itself, this is accomplished in the usual way by dampening the layer and then pressing the same between complementary dies to which heat is applied. An illustrative buckram shape produced in this fashion is illustrated in plan in Fig. 3, and in section in Figs. 1 and 2, where it appears applied to a mold 1 of special construction adapting it for use in my improved apparatus, but of the same shape as the die upon which the buckram has been thus preliminarily shaped.

The mold appearing in said figures is of hollow construction, preferably being made of metal such as zinc, and is provided with a series of perforations or holes 2 disposed at what I shall term critical points, that is, for example, around the outside trimming edge of the hat form, and at the inner edge or incurved portion thereof, as indicated in said Figs. 1 and 2. Such hollow perforated mold, when in use, is designed to be placed over an opening 3 in a suitable chamber 4 adapted to be connected either with a line 5, whereby steam may be admitted thereto, or with a line 6 whereby suction may be exerted in said chamber and, through the opening 3, in the interior of the mold 1. Valves 7 and 8 serve to control the connection of said chamber with lines 5 and 6, respectively, and an annular sheet 10 of rubber serves as a gasket to insure a tight fit between the mold and the top of the chamber.

Assuming the buckram shape A to have been preliminarily prepared in the fashion above described, either the outer face of such shape, to which the layer B of velvet or equivalent material is designed to be attached, is coated with suitable adhesive material such as paste or size, or else the inner face of such sheet of velvet is similarly coated, (or, for that matter, both may be thus coated) such sheet being conveniently left of rectangular form as shown in Fig. 4, but having, if desired, an opening $b$ corresponding in location with that of the crown of the hat. The buckram shape, with its outer face thus pasted, is next placed on the mold 1 as shown in Fig. 1, or the paste may be applied after it has been placed in position on such mold, the mold having been preliminarily heated by admitting steam to the interior of the chamber 4 and by directly applying a gas flame, or like heating agency, to its outer surface. Other modes of heating the mold are illustrated in Figs. 5, 6 and 7, respectively, as will be presently described. Thereupon the sheet B of velvet, being suitably held by the operators at each corner, is laid with its central opening properly disposed over the mold and the suction turned on, at the same time that the corners are gradually released. The steam line 5 will of course have been previously shut off. As a result of such release of the sheet B and the application of the suction to the interior of the mold, the sheet of velvet is drawn instantly and yet snugly into place on the buckram. Any wrinkles that may be incidentally formed at the corner can be readily smoothed out with a stick, although if the sheet be carefully manipulated such wrinkles will seldom occur.

The application of the suction is continued for a sufficient length of time to allow the heated mold to substantially dry the adhesive material between the outer face of the buckram shape and the under face of the velvet layer. As a result, when the shape is removed from the mold, the velvet layer will be firmly attached thereto and given a permanent set, corresponding with the shape of the buckram layer and that of the mold. The portions of the velvet layer extending beyond the trimming edge of the hat will be cut away, and the part may then be submitted to further operations as usual. The next operation will ordinarily be the securing of the under layer to the bottom of the buckram shape in case the part is a brim, as illustrated in the figures previously referred to. Where it is a crown that is being made instead of a brim part, the mode of procedure is substantially the same as that described, save for the difference in shape of the mold. The under side of such a crown part will of course not require to be lined as in the case of a brim, with a layer of velvet or other covering material.

The construction of apparatus illustrated in Fig. 5 differs from that shown in Figs. 1 and 2, first in that the apertures 11 in the incurved portion, or angle, of the mold 1 are larger and covered with a sheet 12 of thin wire gauze. This insures an increased suction at this point, without, however, permitting the shape of the hat part to be distorted or the marks of the holes to be left visible on the part. In addition there is shown in this figure more or less permanent arrangement of heating means, comprising an annular burner 25 that encircles the body of the mold, the gas jets being directed upwardly so as to strike the sides of the latter which is further provided with a flange 26 that prevents the flame from injuring the hat material.

Instead of heating the mold by exteriorly applying heat thereto from an open burner, or series of gas jets, as previously described, the arrangement illustrated in Figs. 6 and 7 may be desirably employed, such arrangement comprising a heating chamber 13 that encircles the outer wall 14 of the mold proper, being formed by a secondary wall 15 integral at its upper edge with such outer wall and conforming in general with the shape of the latter. Connected with this chamber 13 is a tubular chamber or duct 17 that extends transversely of the mold below the lowermost portion of the formed surface of the latter, as shown in Fig. 6, a gas burner 18 being arranged to discharge a blast of heated gases directly into the outer end of such chamber, which is enlarged to form a combustion chamber 19. At a point substantially opposite to the point where the duct 17 connects with the annular chamber 13, a suction line 20 is connected with the latter through which the gases of combustion that are discharged into the chamber from the burner may be withdrawn.

Preferably, as indicated in the figures just referred to, the suction line is thus connected with the annular chamber at a point nearer to the higher side of the mold, rather than to the lower side of such mold, where the latter is of irregular contour, as is generally the case in molds designed for use in the connection in hand. The hot gases will be correspondingly diverted in larger amount to such higher side of the mold, and the uniform heating of the shaped face of the same thus insured.

The mold is supported on the chamber 4 the same as before, and a steam supply line 5 and suction line 6 are connected with the latter, whereby said chamber may be heated, or a suction produced in the interior of the mold proper in order to hold the buckram shape thereon and draw the velvet layer onto such shape, as occasion may require.

As hereinbefore indicated, it is not necessary, in carrying out the present invention, that the body layer of buckram be preliminarily shaped, as shown in Figs. 1, 2 and 3, before being applied to the mold 1; instead, such body layer may be shaped along with the cover layer of velvet, silk or like material, in a single operation. Where such shaping of both layers is to be accomplished simultaneously, a sheet of buckram of substantially the shape and size of the sheet of cover material will be employed, and preferably neither sheet will be apertured, as is indicated, in the case of the preliminarily formed buckram sheet in Fig. 3, and in the case of the cover sheet in Fig. 4.

The sheet of buckram will, however, be dampened and the cover sheet will have its own surface coated with paste or other suitable adhesive material. Thereupon the cover sheet will be applied to the sheet of buckram and the two sheets will be seized at their corners by the operators, usually two in number, each operator taking a corner in each hand, and the sheets thus held will be placed on the mold 1, the latter being at the proper temperature, which it has been found in practice lies between 300° and 350° Fahrenheit. At the same time that the sheets are thus placed over the mold the suction line 6 is open so that the buckram sheet with the cover sheet thus pasted thereon is drawn into close conformity with the outer face of the mold. Inasmuch as the paste does not set for an appreciable interval of time, opportunity is offered for the cover layer to accommodate itself perfectly to the body layer as the latter is drawn snugly to the mold surface, the one layer slipping over the other.

In carrying out this modified form of the process, a die in the form of an annulus or ring 27, as illustrated in Fig. 8, is preferably pressed down over that portion 28 of the die which defines the crown, and in this way the head size of the hat part is established; at the same time the lower edge of the die which is fairly sharp, the die being cut away as shown in said figure, forces the layers of such hat part into the angle between the brim and crown, rendering it unnecessary to press a stick along such angle. The die, it will be observed, comes into contact with the crown portion only, which part will be covered in the completely assembled hat, and does not mar the brim portion in any way.

In this modified procedure, as in the first described procedure, the hat part is allowed to remain on the mold until the adhesive material has become substantially dry, the air suction being maintained until the form of the hat part is well fixed.

With either of the above described modifications of the process and employing either form of apparatus illustrated, it has been found that the manufacture of hats of this type cannot only be accomplished with far greater rapidity than by the previous method of machine manufacture, but the product secured is superior in finish to the present hand manufactured hats of this type. The reason for the superiority of the present process in both these respects should be obvious from the description of the mode of operation involved and does not require further comment in this connection.

Other modes of applying the principle of my invention may be employed instead of the one explained, change being made as regards the steps herein disclosed, provided the steps stated by any of the following claims or the equivalent of such stated steps be employed.

I therefore particularly point out and distinctly claim as my invention:—

1. In a method of manufacturing hats, composed of a body layer and a cover layer, the steps which consist in applying the cover layer to such body layer, suitable adhesive material being interposed between the adjacent surfaces of such layers; and then simultaneously shaping both such layers together over a suitable mold, before such adhesive material sets, whereby such layers may relatively adjust themselves, substantially as described.

2. In a method of manufacturing hats, composed of a body layer and a cover layer, the steps which consist in applying the cover layer to such body layer, suitable adhesive material being interposed between the adjacent surfaces of such layers; then simultaneously shaping both such layers together over a suitable mold, before such adhesive material sets, whereby such layers may relatively adjust themselves; and thereupon heating said mold to set such material and thus fix the shape of such layers.

3. In a method of manufacturing hats, composed of a body layer and a cover layer, the steps which consist in applying the cover layer to such body layer, suitable adhesive material being interposed between the adjacent surfaces of such layers; and then simultaneously shaping both such layers together by drawing the same into forceful contact with a suitable mold by suction, before such adhesive material sets, whereby such layers may relatively adjust themselves, substantially as described.

4. In a method of manufacturing hats, composed of a body layer and a cover layer, the steps which consist in applying the cover layer to such body layer, suitable adhesive material being interposed between the adjacent surfaces of such layers; then simultaneously shaping both such layers by drawing the same into forceful contact with a suitable mold by suction, before such adhesive material sets, whereby such layers may relatively adjust themselves; and thereupon heating said mold to set such material and thus fix the shape of such layers.

5. In a method of manufacturing hats, composed of a body layer and a cover layer, the steps which consist in applying such cover layer to such body layer, suitable adhesive material being interposed between the adjacent surfaces of such layers; and then simultaneously shaping both such layers together by drawing the same into forceful contact with a suitable mold by suction, the outer surface of the composite body being open to the atmosphere.

6. In a method of manufacturing hats, composed of a body layer and a cover layer, the steps which consist in applying such cover layer to such body layer, suitable adhesive material being interposed between the adjacent surfaces of such layers; and then simultaneously shaping and setting both such layers by drawing the same into forceful contact with a suitable heated mold by suction, the outer surface of the composite body being open to the atmosphere.

Signed by me, this 6th day of May, 1914.

JAMES J. TRACY.

Attested by:—
  D. T. DAVIES,
  A. L. GILL.